US012736631B2

United States Patent
(12) Ta et al.

(10) Patent No.: US 12,736,631 B2
(45) Date of Patent: Sep. 15, 2026

(54) LIGHT PROJECTING APPARATUS, DISTANCE MEASURING APPARATUS, AND LIGHT PROJECTION CONTROL METHOD OF LASER LIGHT

(71) Applicant: KABUSHIKI KAISHA TOSHIBA, Tokyo (JP)

(72) Inventors: Tuan Thanh Ta, Kawasaki (JP); Akihide Sai, Yokohama (JP); Yosuke Toyama, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1043 days.

(21) Appl. No.: 17/930,556

(22) Filed: Sep. 8, 2022

(65) Prior Publication Data

US 2023/0146289 A1 May 11, 2023

(30) Foreign Application Priority Data

Nov. 9, 2021 (JP) ................................ 2021-182794

(51) Int. Cl.

*G01S 7/481* (2006.01)
*G01S 7/4861* (2020.01)
*G01S 7/497* (2006.01)
*G01S 17/10* (2020.01)
*G01S 17/931* (2020.01)

(52) U.S. Cl.

CPC .......... *G01S 7/4815* (2013.01); *G01S 7/4817* (2013.01); *G01S 7/4861* (2013.01); *G01S 7/4972* (2013.01); *G01S 17/10* (2013.01); *G01S 17/931* (2020.01)

(58) Field of Classification Search

CPC .... G01S 7/4815; G01S 7/4817; G01S 7/4861; G01S 7/4972; G01S 17/10; G01S 17/931

See application file for complete search history.

(56) References Cited

U.S. PATENT DOCUMENTS 5,552,893 A * 9/1996 Akasu ...................... G01C 3/00 356/5.01
6,654,399 B1 11/2003 Kimura et al.
9,383,753 B1 * 7/2016 Templeton ........... G05D 1/0246
10,514,444 B2 12/2019 Donovan
10,613,276 B2 * 4/2020 Mansouri Rad ........ G01S 17/06
10,969,474 B2 4/2021 O'Keeffe (Continued)

FOREIGN PATENT DOCUMENTS

CA 3125718 A1 * 10/2021 ........... G01S 7/4972
CN 113534119 A 10/2021

(Continued)

OTHER PUBLICATIONS

English Translation Description WO2021220861A1.*

(Continued)

*Primary Examiner* — Assres H Woldemaryam
(74) *Attorney, Agent, or Firm* — Finnegan, Henderson, Farabow, Garrett & Dunner, LLP

(57) ABSTRACT

A light projecting apparatus has a plurality of light projectors, each being capable of switching an emission direction and an emission timing of an optical signal, and a plurality of first controllers, each controlling an emission direction and an emission timing of an optical signal emitted from a corresponding light projector among the plurality of light projectors.

17 Claims, 11 Drawing Sheets

21 : DISTANCE MEASURING APPARATUS

(56) References Cited

U.S. PATENT DOCUMENTS

| | | | | |
|---|---|---|---|---|
| 2010/0271614 | A1* | 10/2010 | Albuquerque | G01S 7/4811 356/4.01 |
| 2020/0033474 | A1 | 1/2020 | Petit | |
| 2020/0191613 | A1* | 6/2020 | Englund | G08B 13/1672 |
| 2020/0200882 | A1* | 6/2020 | Maier | G01S 17/89 |
| 2020/0292667 | A1* | 9/2020 | Yoshino | G01S 7/4861 |
| 2021/0208250 | A1* | 7/2021 | Liu | G01S 7/4865 |
| 2021/0293931 | A1* | 9/2021 | Nemet | G01S 7/4813 |
| 2021/0318416 | A1* | 10/2021 | Yamakawa | G01S 17/42 |
| 2022/0120908 | A1 | 4/2022 | Kato et al. | |
| 2024/0036197 | A1 | 2/2024 | Suzuki et al. | |

FOREIGN PATENT DOCUMENTS

| | | | | |
|---|---|---|---|---|
| JP | 2000-310679 A | | 11/2000 | |
| JP | 2017-150902 A | | 8/2017 | |
| JP | 2017-187386 A | | 10/2017 | |
| JP | 2019-526056 A | | 9/2019 | |
| JP | 2020-509389 A | | 3/2020 | |
| JP | 2021-105613 A | | 7/2021 | |
| JP | 2021-173663 A | | 11/2021 | |
| JP | 7457950 B2 | | 3/2024 | |
| WO | WO-2021220861 A1 | * | 11/2021 | G01S 17/08 |

OTHER PUBLICATIONS

Japan Patent Office, Office Action in JP App. No. JP 2021-182794, 2 pages, with machine translation, 4 pages (Oct. 22, 2024).

Japan Patent Office, Office Action in JP App. No. 2025-090006 (Nov. 14, 2025).

Japan Patent Office, Decision to Grant a Patent in JP App. No. 2025-090006 (Jul. 3, 2026).

* cited by examiner

LIGHT PROJECTING APPARATUS, DISTANCE MEASURING APPARATUS, AND LIGHT PROJECTION CONTROL METHOD OF LASER LIGHT

CROSS REFERENCE TO RELATED APPLICATIONS

This application is based upon and claims the benefit of priority from the prior Japanese Patent Application No. 2021-182794, filed on Nov. 9, 2021, the entire contents of which are incorporated herein by reference.

FIELD

An embodiment of the present invention relates to a light projecting apparatus, a distance measuring apparatus, and a light projection control method of laser light.

BACKGROUND

The automatic driving technique requires a technique for detecting an object present around a vehicle in a non-contact manner at high speed and with high accuracy. A time of flight (ToF) method is generally adopted in which a distance to an object is detected based on a time until laser light emitted from a vehicle is reflected by the object and received. In order to detect an object around a vehicle, it is necessary to irradiate a relatively wide range with laser light, and a scanning mechanism for periodically scanning the laser light in a two-dimensional direction is often provided. However, it is not easy to downsize the scanning mechanism.

In addition, since the laser light has extremely high light intensity per unit area as compared with other illumination light, there is a risk of damaging human eyes when the laser light directly enters the human eyes. Therefore, it is necessary to set the light intensity conforming to the laser safety standard. However, when the light intensity is weakened, the laser light does not reach a distant object, and the range in which the distance can be measured is limited. Further, a laser light source has a limited light emission capability, and it is necessary to use a plurality of laser light sources for an application that further extends a range in which a long distance can be measured. However, in the case of using a plurality of laser light sources, an optical system or the like that combines the plurality of laser light sources into one laser beam becomes complicated, which leads to an increase in design cost and an increase in size of a light projecting system.

DETAILED DESCRIPTION

According to one embodiment, a light projecting apparatus has:

- a plurality of light projectors, each being capable of switching an emission direction and an emission timing of an optical signal; and
- a plurality of first controllers, each controlling an emission direction and an emission timing of an optical signal emitted from a corresponding light projector among the plurality of light projectors.

Hereinafter, embodiments of a light projecting apparatus, a distance measuring apparatus, and a light projection control method of laser light will be described with reference to the drawings. Hereinafter, the main components of the light projecting apparatus and the distance measuring apparatus will be mainly described, but the light projecting apparatus and the distance measuring apparatus may have components and functions that are not illustrated or described. The following description does not exclude components and functions that are not illustrated or described.

First Embodiment

Figure 1:
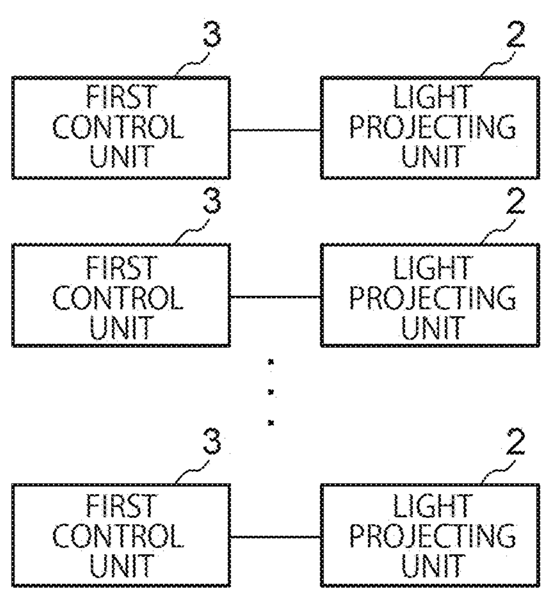
FIG. 1 is a block diagram illustrating a schematic configuration of a light projecting apparatus according to a first embodiment.

FIG. 1 is a block diagram illustrating a schematic configuration of a light projecting apparatus 1 according to a first embodiment. The light projecting apparatus 1 of FIG. 1 has a function of emitting a plurality of optical signals, and can be built in, for example, a distance measuring apparatus as described later. Note that the light projecting apparatus 1 of FIG. 1 can also be used for various purposes other than the distance measuring apparatus.

The light projecting apparatus 1 of FIG. 1 includes a plurality of light projecting units 2 and a plurality of first control units 3. Each of the plurality of light projecting units 2 can switch an emission direction and an emission timing of an optical signal. Each of the plurality of first control units 3 is provided in association with any one of the light projecting units 2. Each of the plurality of first control units 3 controls the emission direction and the emission timing of the optical signal emitted from the corresponding light projecting unit 2. More specifically, each of the plurality of first control units 3 supplies a control signal to the corresponding light projecting unit 2. Each light projecting unit 2 emits an optical signal of an emission direction and an emission timing according to a control signal from the corresponding first control unit 3.

The optical signal emitted from each light projecting unit 2 is a so-called laser light pulse. The laser light is coherent light having a uniform wavelength and phase, and has a single wavelength of 900 nm, for example. Note that the wavelength of the optical signal emitted from each light projecting unit 2 is freely selectable.

The light intensity of the optical signal emitted from each light projecting unit 2 generally needs to be a value conforming to a laser (eye safe) safety standard. By emitting an optical signal whose light intensity, pulse time, repetition frequency of pulses, and the like conform to the laser safety standard from each light projecting unit 2, even if the optical signal enters human eyes, there is no risk of damaging the human eyes. However, in a special environment that does not need to conform to the eye safe safety standard, each light projecting unit 2 may increase power, time, and the like of a laser pulse to extend a range of a distance measurement distance of a light detection and ranging (LiDAR) device.

As described above, in the present embodiment, the light intensity of the optical signal emitted from each light projecting unit 2 is set to a value conforming to the laser safety standard. The higher the light intensity of the optical signal, the farther the optical signal can reach, but it is not preferable from the viewpoint of eye safe. Therefore, in the present embodiment, it is considered that an optical signal having light intensity conforming to the laser safety standard is emitted from each light projecting unit 2. Although the laser light has high rectilinearity, the beam size increases and the light intensity per unit area decreases as the optical path length increases. In the present embodiment, the beam of the plurality of optical signals emitted from the plurality of light projecting units 2 at least partially overlap each other at a distant place. The light intensity increases in the region where the beam of the plurality of optical signals overlap each other. As described above, even if the light intensity of the optical signal emitted from each light projecting unit 2 is not so high, the beam of the plurality of optical signals overlap each other at a distant place, so that the light intensity can be maintained high and the optical signal can reach a distant place.

Figure 2:
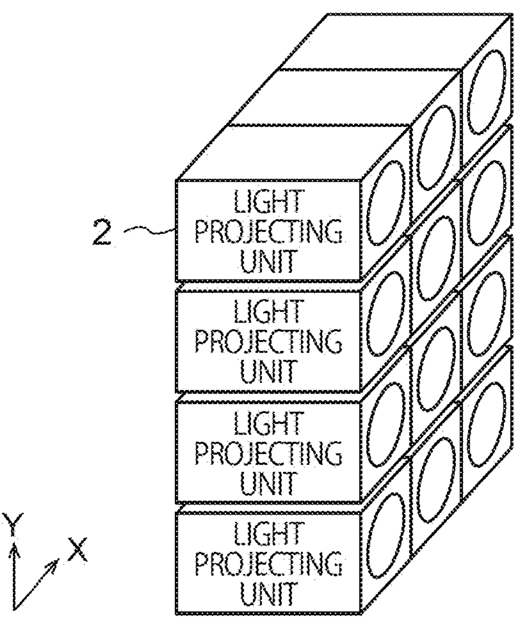
FIG. 2 is a perspective view of a plurality of light projecting units.

FIG. 2 is a perspective view of the plurality of light projecting units 2. As illustrated in the drawing, a plurality of the light projecting units 2 are arranged in each of a horizontal direction X and a vertical direction Y. FIG. 2 illustrates an example in which three light projecting units 2 are provided in the horizontal direction X and four light projecting units 2 are provided in the vertical direction Y, but the number of light projecting units 2 is not limited. In addition, the plurality of light projecting units 2 may be arranged in a one-dimensional direction (the horizontal direction X or the vertical direction Y).

Figure 3:
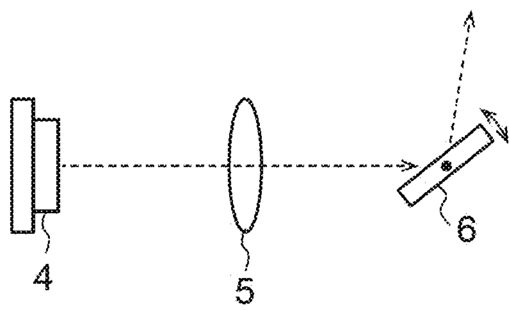
FIG. 3 is a block diagram illustrating an example of an internal configuration of each light projecting unit.

FIG. 3 is a block diagram illustrating an example of an internal configuration of each light projecting unit 2. As illustrated in FIG. 3, each light projecting unit 2 includes a light source 4, an optical system 5, and a scanning unit 6.

The light source 4 is the laser light source 4 that emits laser light as described above. The laser light source 4 is, for example, a semiconductor laser. Alternatively, the laser light source 4 may be other than a semiconductor laser such as a HeNe laser. A pulsed optical signal is emitted from the light source 4. The light source 4 can switch an emission timing of an optical signal based on a control signal from the corresponding first control unit 3.

The optical system 5 shapes the optical signal emitted from the light source 4. Here, shaping means adjusting a beam shape and a traveling direction of an optical signal, a spread angle of a beam, and the like. An example of the optical system 5 is a collimator lens. The collimator lens can collimate the incident diffused optical signal.

The scanning unit 6 scans the optical signal shaped by the optical system 5 within a predetermined light emission range. The scanning unit 6 can control the light emission range based on a control signal from the corresponding first control unit 3. The light emission range is a range of any size spreading in a two-dimensional direction or a one-dimensional direction. Furthermore, the scanning unit 6 can adjust the scanning speed when scanning the optical signal within the light emission range based on the control signal from the corresponding first control unit 3.

More specifically, the scanning unit 6 includes, for example, a micro-electro-mechanical systems (MEMS) mirror. The angle of the MEMS mirror can be electrically variable. When the angle of the MEMS mirror is changed, the reflection direction of the optical signal radiated to the MEMS mirror can be changed. Therefore, by changing the angle of the MEMS mirror based on the control signal from the corresponding first control unit 3, the emission direction of the optical signal emitted from each light projecting unit 2 can be changed little by little, and the optical signal can be scanned within a predetermined light emission range.

Some MEMS mirrors rotate about one axis, and some rotate about two axes. By using the MEMS mirror rotating about two axes and changing the angle of the MEMS mirror little by little in two axis directions, the optical signal can be scanned within the light emission range spreading in two-dimensional directions.

In this manner, each light projecting unit 2 can individually adjust the emission direction and the emission timing of the optical signal based on the control signal from the corresponding first control unit 3. Therefore, the plurality of optical signals emitted from the plurality of light projecting units 2 can be emitted in substantially the same direction, and the optical signal can be emitted in any direction for each light projecting unit 2. In addition, all the light projecting units 2 can emit a plurality of optical signals at substantially the same timing, or each light projecting unit 2 can emit an optical signal at any timing.

Figure 4:
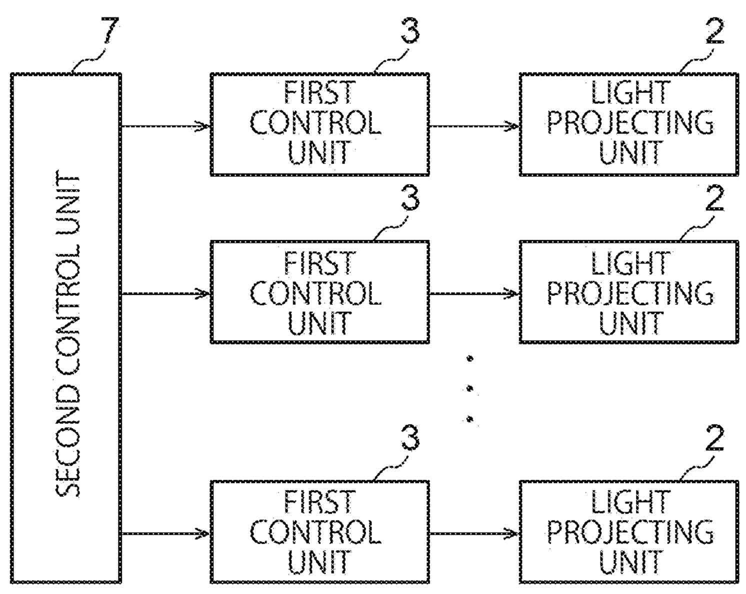
FIG. 4 is a block diagram of a light projecting apparatus in which a second control unit is added to the configuration of FIG. 1.

The plurality of first control units 3 may be controlled by the second control unit 7. FIG. 4 is a block diagram of the light projecting apparatus 1*a* in which the second control unit 7 is added to the configuration of FIG. 1. The second control unit 7 supplies an angle command signal related to the emission direction of the optical signal to each of the plurality of first control units 3. The angle command signal is a signal that instructs the emission direction of the optical signal emitted from each of the plurality of first light projecting units 2. That is, in the light projecting apparatus 1*a* of FIG. 4, the second control unit 7 controls the emission direction of the optical signal emitted from each light projecting unit 2. By providing the second control unit 7, it is possible to collectively control in which direction the optical signal is emitted from the plurality of light projecting units 2, and it is easy to control the plurality of light projecting units 2. In addition, the second control unit 7 may control not only the emission direction of the optical signal emitted from each light projecting unit 2 but also the emission timing.

Figure 5:
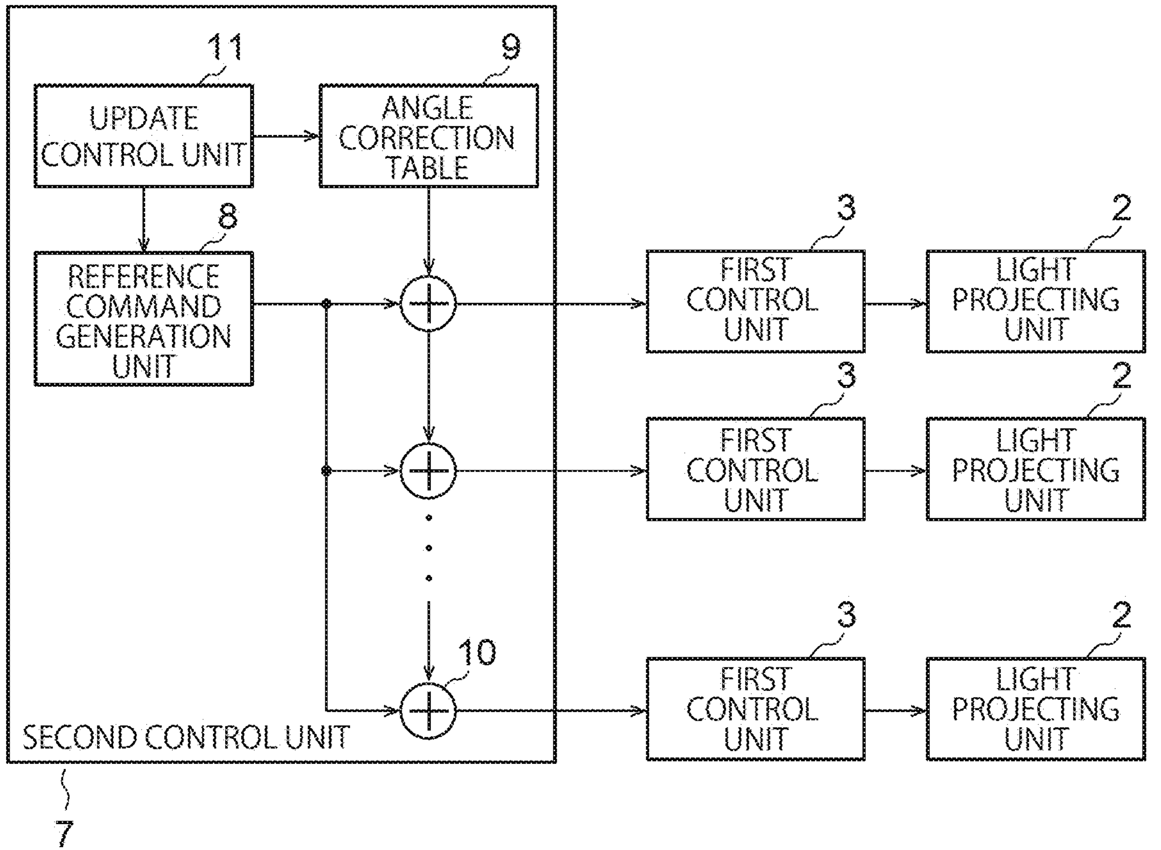
FIG. 5 is a block diagram illustrating an example of an internal configuration of the second control unit.

FIG. 5 is a block diagram illustrating an example of an internal configuration of the second control unit 7. The second control unit 7 of FIG. 5 includes a reference command generation unit 8, an angle correction table 9, a plurality of adders 10, and an update control unit 11.

The reference command generation unit 8 generates a reference command signal commonly provided to all the light projecting units 2. The reference command signal is not necessarily one type. The reference command generation unit 8 may generate any of a plurality of types of reference command signals. The reference command signal generated by the reference command generation unit 8 is input to the plurality of adders 10.

The angle correction table 9 stores an angle correction signal for correcting the reference command signal for each of the plurality of light projecting units 2. When the reference command generation unit 8 generates one of the plurality of types of reference command signals, the angle correction table 9 stores the angle correction signal corresponding to each of the plurality of light projecting units 2 for each reference command signal. The angle correction signal includes an offset of an angle intended for each light projecting unit 2 and an angle error of each light projecting unit 2 due to installation, manufacturing, and the like. For the data creation of the angle error, a laser may be emitted from each light projecting unit 2 in advance, and the angle may be measured by a light receiving device, a photosensitive paper, or the like (not illustrated in FIG. 5).

As described above, the angle correction table 9 may store a plurality of sets of correspondences between the reference command signals and the plurality of angle correction signals, and the plurality of angle correction signals may be different for each set. In this case, the second control unit 7 selects one set from the plurality of sets stored in the angle correction table 9, reads the corresponding angle correction signal from the angle correction table 9 for each of the plurality of light projecting units 2 based on the correspondence relationship of the selected set, and loads the reference command signal, thereby generating the angle command signal.

Figure 6A:
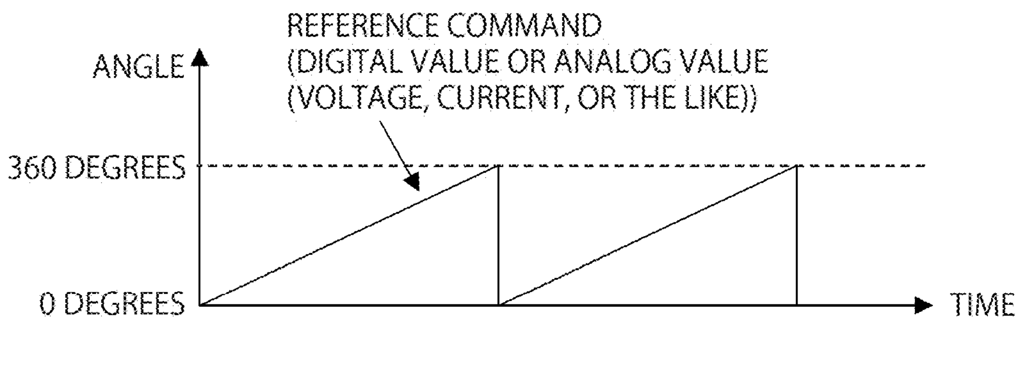
FIG. 6A is a diagram showing a first specific example of a plurality of types of reference command signals.

Hereinafter, two specific examples of the plurality of types of reference command signals generated by the reference command generation unit 8 and the angle correction table 9 will be described. FIG. 6A is a diagram showing a first specific example of the plurality of types of reference command signals. As shown in FIG. 6A, the reference command signal in the first specific example is a signal instructing continuous or stepwise change of the emission direction according to time for each cycle. The reference command signal is an analog value or a digital value, and may be a voltage signal or a current signal. The angle correction table 9 stores, for example, an angle correction signal for making the emission direction parallel for each of the plurality of light projecting units 2. For example, in a case where the emission direction of one of the two adjacent light projecting units 2 is shifted by plus 1 degree from the other light projecting unit in the default state, the angle correction table 9 sets the angle correction signal of the emission direction of one of the two light projecting units 2 to 0 degrees and sets the angle correction signal of the emission direction of the other to −1 degrees. As a result, the emission directions of the optical signals emitted from the two light projecting units 2 can be made parallel.

Figure 6B:
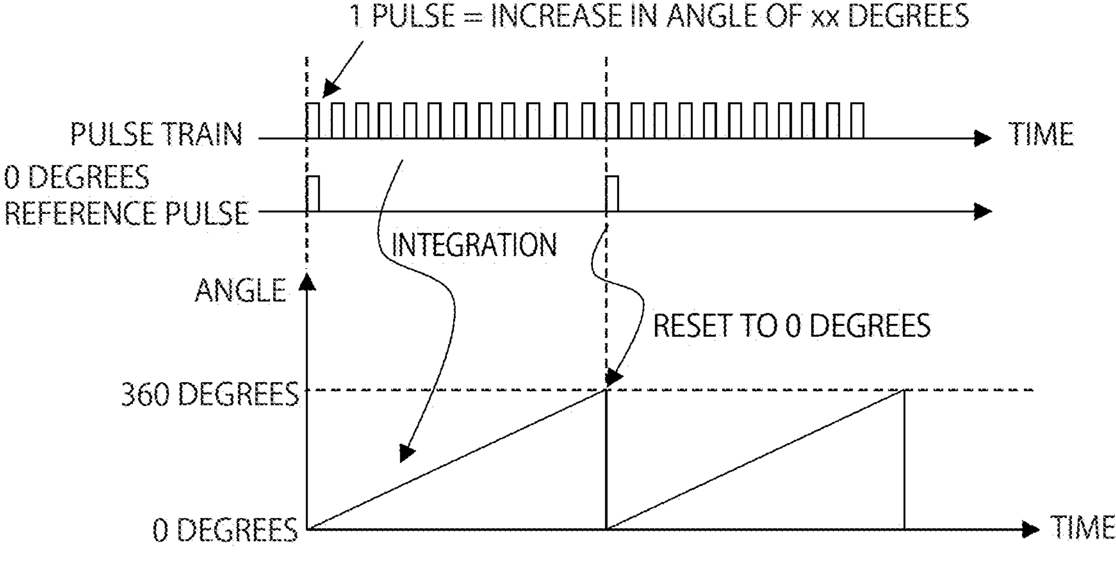
FIG. 6B is a diagram showing a second specific example of the plurality of types of reference command signals.

FIG. 6B is a diagram showing a second specific example of the plurality of types of reference command signals. The reference command signal in the second specific example is emitted a plurality of times at predetermined time intervals, and becomes a pulse train signal as shown in FIG. 6B. The emission direction of each reference command signal is changed by an angle corresponding to the number of times of emission of the optical signal. For example, when the emission direction of the optical signal is changed by m degrees every time the reference command signal is emitted, the emission direction of the n-th reference command signal is changed by m×n degrees as compared with the first reference command signal. As shown in FIG. 6B, the emission direction is periodically changed in a range of 0 to 360 degrees.

Similarly to the angle correction table 9 in the first specific example, the angle correction table 9 in the second specific example stores, for example, the angle correction signals such that the emission directions of the optical signals emitted from the plurality of light projecting units 2 are parallel.

Note that the plurality of types of reference command signals and the angle correction signals stored in the angle correction table 9 are not necessarily limited to the first specific example and the second specific example described above.

The plurality of adders 10 are provided in association with the plurality of first control units 3. Each of the plurality of adders 10 adds the reference command signal and the corresponding angle correction signal read from the angle correction table 9 to generate a corresponding angle command signal for the first control unit 3.

The angle correction signal stored in the angle correction table 9 may be updated as necessary. For example, the update control unit 11 in the second control unit 7 updates the angle correction signal stored in the angle correction table 9. By updating the angle correction signal stored in the angle correction table 9 by the update control unit 11, the emission directions of the optical signals emitted from the plurality of light projecting units 2 can be switched as necessary, and the reconfigurable light projecting apparatus 1*a* can be realized. Note that the update control unit 11 and the reference command generation unit 8 may be integrated.

The second control unit 7 is not necessarily configured as illustrated in FIG. 5. For example, without providing the reference command signal, the angle command signals for the plurality of first control units 3 may be directly generated by the second control unit 7 and supplied to the corresponding first control units 3.

In the light projecting apparatuses 1 and 1*a* of FIGS. 1 to 5, the configuration in which the emission direction of the optical signal emitted from each of the plurality of light projecting units 2 can be individually controlled has been described, but the plurality of light projecting units 2 may be integrated to collectively scan the plurality of optical signals emitted from the plurality of light projecting units 2 in the one-dimensional direction or the two-dimensional direction.

Figure 7:
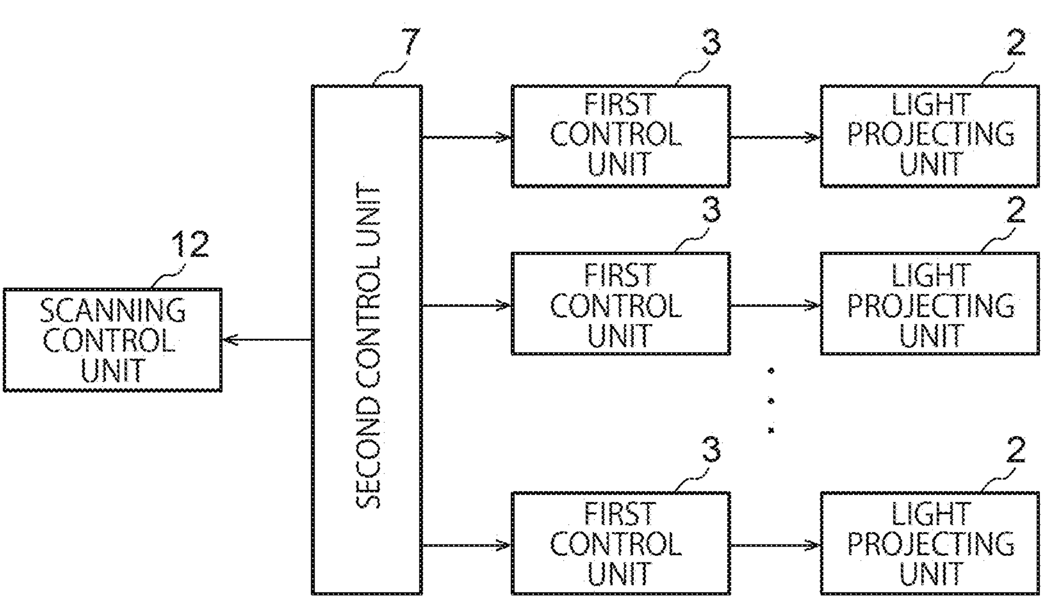
FIG. 7 is a block diagram illustrating a schematic configuration of a light projecting apparatus in which a scanning control unit is added to the configuration of FIG. 4.
Figure 8:
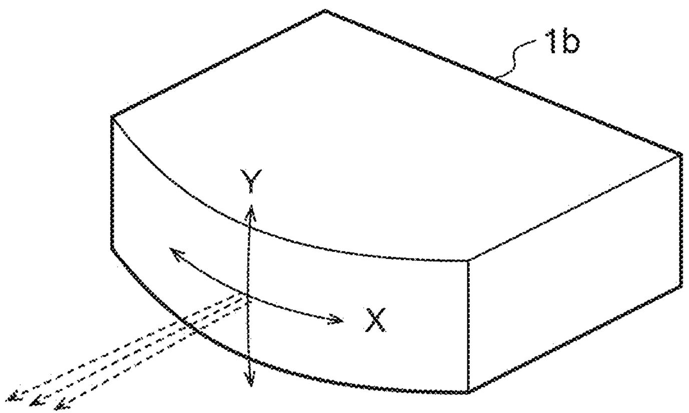
FIG. 8 is a perspective view of the light projecting apparatus of FIG. 7.

FIG. 7 is a block diagram illustrating a schematic configuration of a light projecting apparatus 1*b* in which a scanning control unit 12 is added to the configuration of FIG. 4, and FIG. 8 is a perspective view of the light projecting apparatus 1*b* of FIG. 7. The scanning control unit 12 periodically scans the optical signals emitted from the plurality of light projecting units 2 integrally in a one-dimensional direction or a two-dimensional direction. For example, as illustrated in FIG. 8, the scanning control unit 12 may cause the light projecting apparatus 1*b* to periodically scan at least one of the horizontal direction X and the vertical direction Y for each housing thereof.

According to the light projecting apparatus 1*b* of FIG. 7, the emission directions of the plurality of optical signals emitted from the plurality of light projecting units 2 can be individually controlled by the corresponding first control units 3, and the emission directions of the plurality of optical signals can be integrally controlled by the scanning control unit 12.

As described above, the light projecting apparatuses 1, 1*a*, and 1*b* according to the first embodiment include the plurality of light projecting units 2 and the plurality of first control units 3, and the emission direction and the emission timing of the optical signal emitted from each of the plurality of light projecting units 2 are controlled by the corresponding first control unit 3. As a result, the emission direction and the emission timing of the optical signal emitted from each of the plurality of light projecting units 2 can be individually and arbitrarily adjusted, and the plurality of optical signals emitted from the plurality of light projecting units 2 can be used for various applications.

In addition, since the second control unit 7 that controls the plurality of first control units 3 is provided and the angle command signals are supplied from the second control unit 7 to the plurality of first control units 3, it is possible to realize the reconfigurable light projecting apparatuses 1, 1*a*, and 1*b* in which the emission directions and the emission timings of the optical signals from the plurality of light projecting units 2 are changed by updating the angle command signals as necessary.

Second Embodiment

Light projecting apparatuses 1*a* and 1*b* according to a second embodiment have a block configuration similar to that in FIGS. 4 to 7. In the light projecting apparatuses 1*a* and 1*b* according to the second embodiment, the second control unit 7 controls the plurality of light projecting units 2 so that optical signals traveling substantially in parallel are emitted from the plurality of light projecting units 2.

Figure 9:
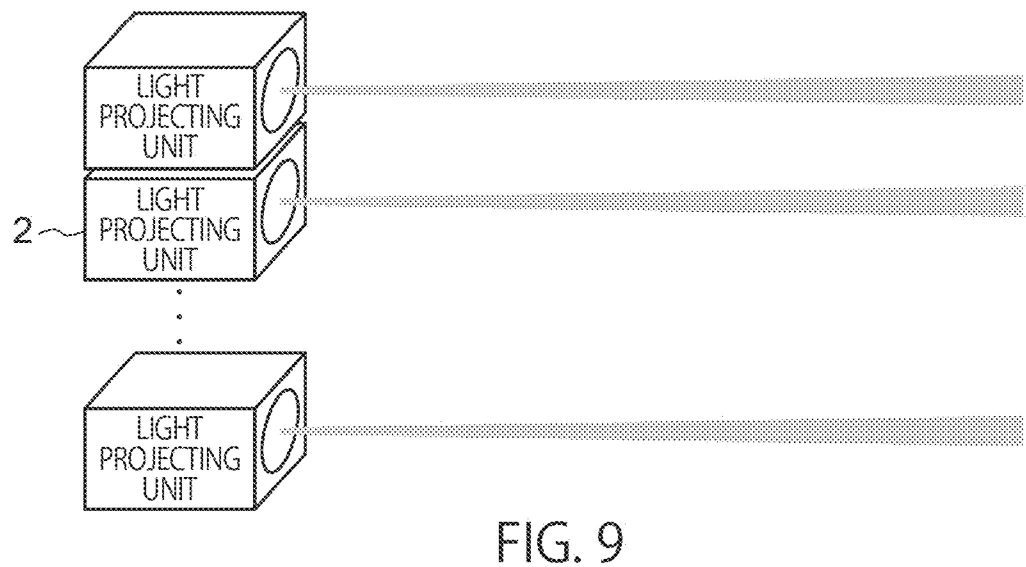
FIG. 9 is a diagram schematically illustrating beam shapes of optical signals emitted from the plurality of light projecting units.

FIG. 9 is a diagram schematically illustrating beam shapes of optical signals emitted from the plurality of light projecting units 2. As illustrated in FIG. 9, the plurality of optical signals emitted from the plurality of light projecting units 2 travel in substantially parallel directions. The emission direction of the optical signal emitted from each of the plurality of light projecting units 2 is controlled by the corresponding first control unit 3. As illustrated in FIG. 4, an angle command signal is supplied from the second control unit 7 to each of the plurality of first control units 3 corresponding to the plurality of light projecting units 2. Each of the plurality of first control units 3 controls the emission direction of the optical signal emitted from the corresponding light projecting unit 2 based on the corresponding angle command signal. In the case of the present embodiment, the corresponding first control unit 3 controls the emission direction of the optical signal emitted from the corresponding light projecting unit 2 by the angle command signal from the second control unit 7, and the plurality of optical signals emitted from the plurality of light projecting units 2 are made substantially parallel.

Figure 10A:
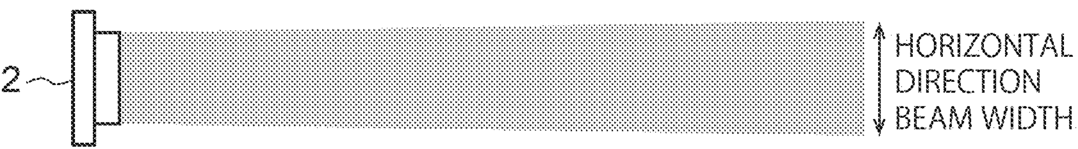
FIG. 10A is a diagram illustrating a change in beam width in a horizontal direction.

The beam width of the optical signal emitted from each light projecting unit 2 increases as it goes farther, but the degree of spread of the beam width is different between the horizontal direction and the vertical direction. FIGS. 10A and 1013 are diagrams schematically illustrating the beam width of the optical signal emitted from each light projecting unit 2, FIG. 10A illustrates a change in the beam width in the horizontal direction, and FIG. 10B illustrates a change in the beam width in the vertical direction.

Figure 10B:
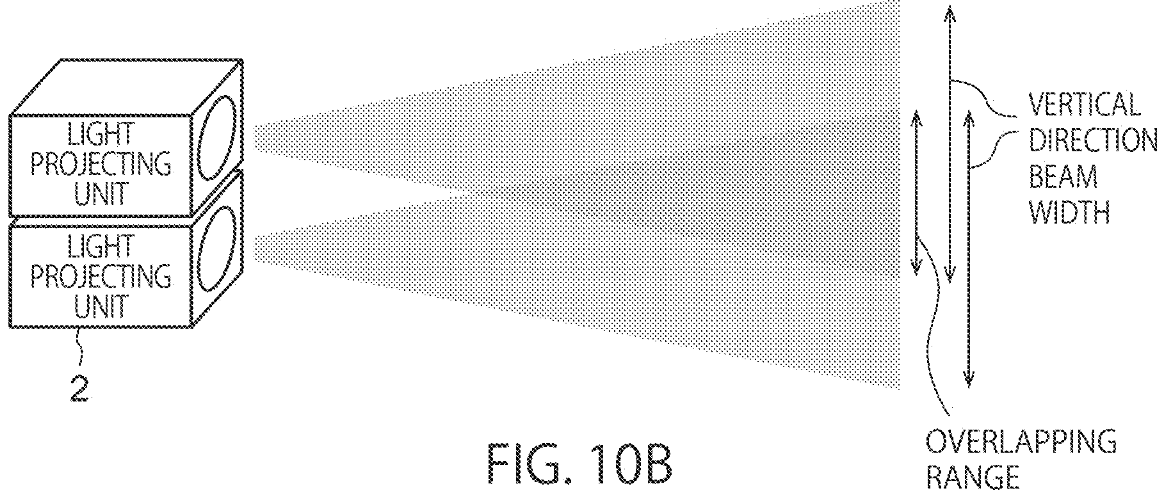
FIG. 10B is a diagram illustrating a change in beam width in a vertical direction.

In the optical signal emitted from each light projecting unit 2, the beam width in the horizontal direction hardly changes even when the distance changes as illustrated in FIG. 10A, whereas the beam width in the vertical direction greatly changes according to the distance as illustrated in FIG. 10B. More specifically, the beam width in the vertical direction increases as the distance increases.

By arranging the plurality of light projecting units 2 in the vertical direction, a region in which the optical signals emitted from the plurality of light projecting units 2 overlap each other in the vertical direction is generated at a place distant from the light projecting apparatuses 1*a* and 1*b*. In this region, the light intensity is higher than that of a single optical signal.

As described above, in the second embodiment, the plurality of optical signals are emitted from the plurality of light projecting units 2 in the substantially parallel direction, and the plurality of optical signals emitted from the plurality of light projecting units 2 partially overlap each other in the vertical direction, so that the light intensity at a distant place can be increased. As illustrated in FIG. 10B, when the interval between the plurality of light projecting units 2 arranged in the vertical direction changes, the range in which the plurality of optical signals overlap each other in the vertical direction at a distant place changes. If each laser beam does not spread so much and overlaps at a short distance where the laser intensity is strong, the overlapping portion may not be eye safe compliant. Therefore, it is desirable to adjust the interval between the plurality of light projecting units 2 arranged in the vertical direction so that the overlapping range can conform to the eye safe standard.

In addition, in the light projecting apparatuses 1*a* and 1*b* according to the second embodiment, the plurality of light projecting units 2 may emit optical signals at substantially the same emission timing. For example, in the distance measuring apparatus which is an application example of the light projecting apparatuses 1*a* and 1*b* according to the present embodiment, the optical signal is repeatedly emitted at predetermined time intervals, the reflected optical signal from the object is repeatedly received, and the distance to the object is measured based on the light reception result. As described above, in a case where the light projecting apparatuses 1*a* and 1*b* according to the present embodiment are used in the distance measuring apparatus, the operation of emitting the optical signals from the plurality of light projecting units 2 at substantially the same timing is repeatedly performed at predetermined time intervals, and the reflected optical signal from the object is repeatedly received to measure the distance to the object.

Third Embodiment

Light projecting apparatuses 1*a* and 1*b* according to a third embodiment classify the plurality of light projecting units 2 into a plurality of light projecting groups. In the second embodiment, the example in which the plurality of light projecting units 2 emit the plurality of optical signals in substantially the same emission direction has been described, but in the third embodiment, the plurality of light projecting units 2 are classified into two or more light projecting groups, and the emission direction of the optical signal is individually controlled for each light projecting group.

More specifically, in the third embodiment, N (N is an integer of 2 or more) light projecting units 2 are classified into M (2<M N) light projecting groups, and the light projecting units 2 belonging to the same light projecting group emit optical signals in the same emission direction. In addition, the light emission ranges of the light projecting units 2 belonging to different light projecting groups do not overlap each other or only partially overlap each other.

As a result, the light emission ranges of the light projecting apparatuses 1*a* and 1*b* including the plurality of light projecting units 2 can be wider than the light emission range of the single light projecting unit 2. For example, in the case where the MEMS mirror is used in the scanning unit 6 of the light projecting unit 2, the light emission range of the light projecting unit 2 is narrowed because the drive range of the MEMS mirror is narrowed. Therefore, by providing a plurality of MEMS mirrors, the light emission range as a whole can be expanded.

Figure 11:
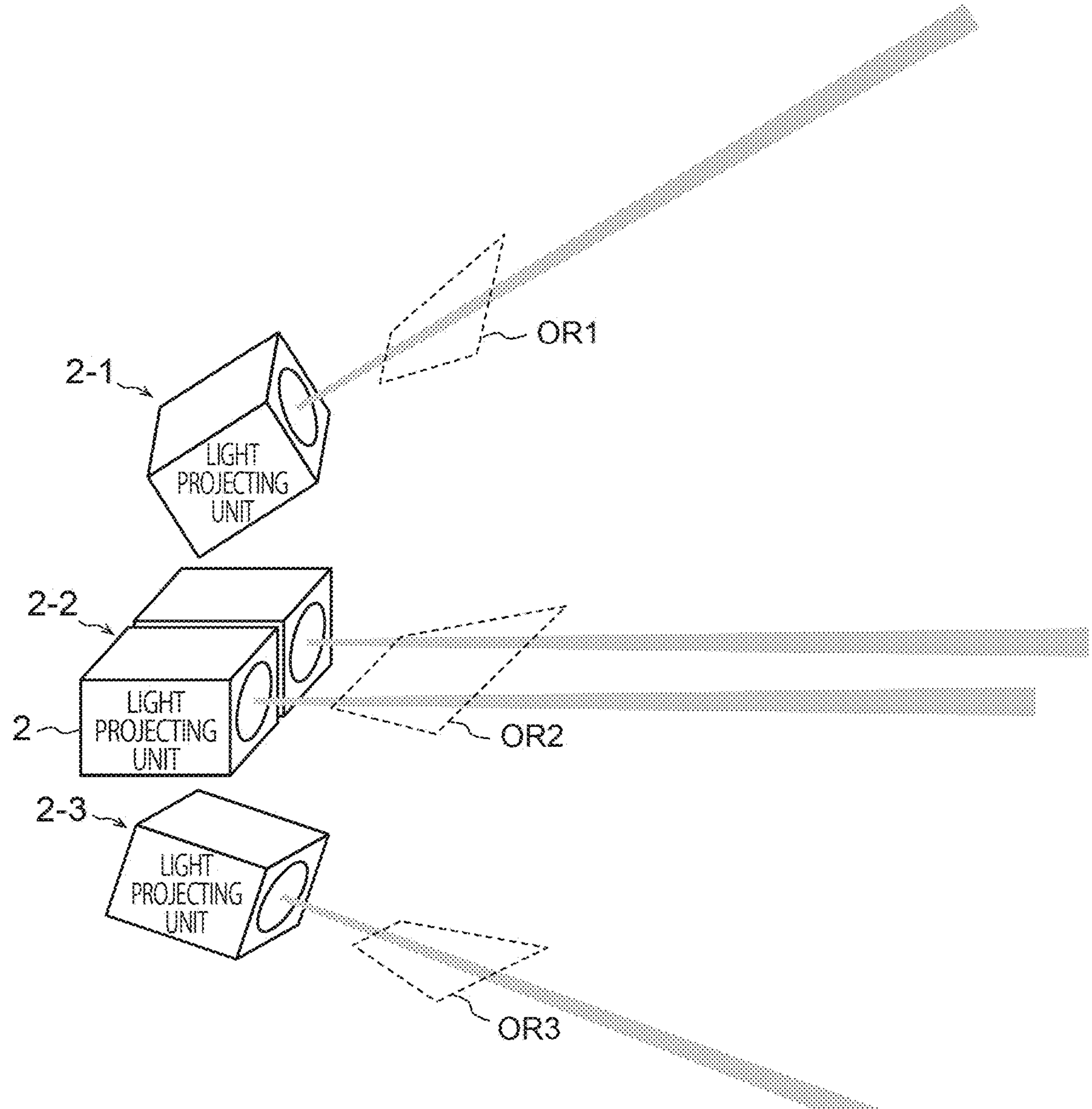
FIG. 11 is a diagram schematically illustrating characteristic portions of the light projecting apparatuses according to a third embodiment.

FIG. 11 is a diagram schematically illustrating characteristic portions of the light projecting apparatuses 1*a* and 1*b* according to the third embodiment. FIG. 11 illustrates an example in which a plurality of (for example, four) light projecting units 2 are classified into three light projecting groups (hereinafter, first to third light projecting groups) 2-1, 2-2, and 2-3, and the emission direction of the optical signal is individually controlled for each light projecting group.

The light projecting unit 2 belonging to the first light projecting group 2-1 scans the optical signal in a first light emission range OR1. The light projecting unit 2 belonging to the second light projecting group 2-2 scans the optical signal in a second light emission range OR2. The light projecting unit 2 belonging to the third light projecting group 2-3 scans the optical signal in a third light emission range OR3. FIG. 11 illustrates an example in which the first light emission range OR1, the second light emission range OR2, and the third light emission range OR3 do not overlap each other, but may partially overlap each other. That is, the emission direction of the optical signal emitted from the light projecting unit 2 belonging to the first light projecting group 2-1, the emission direction of the optical signal emitted from the light projecting unit 2 belonging to the second light projecting group 2-2, and the emission direction of the optical signal emitted from the light projecting unit 2 belonging to the third light projecting group 2-3 may be completely different from each other, or may partially overlap each other.

As can be seen from FIG. 11, since the light emission ranges of the first to third light projecting groups 2-1 to 2-3 are at least partially different from each other, the light emission range of the entire light projecting apparatuses 1*a* and 1*b* can be expanded more than the light emission range of one light projecting group.

The manner of classifying the plurality of light projecting units 2 into the plurality of light projecting groups may be determined in advance. In this case, the first control unit 3 corresponding to each light projecting unit 2 may grasp the emission direction and the emission timing of the optical signal.

Alternatively, what kind of light projecting group the plurality of light projecting units 2 are classified into may be arbitrarily adjusted. In this case, the second control unit 7 performs control to classify the plurality of light projecting units 2 into a plurality of light projecting groups. The second control unit 7 transmits, to the plurality of first control units 3, information regarding to which light projecting group the corresponding light projecting unit 2 belongs. The information transmitted from the second control unit 7 to the plurality of first control units 3 also includes information indicating the light emission range of each light projecting group.

By allowing the second control unit 7 to change the light projecting group into which the plurality of light projecting units 2 are classified as necessary, it is possible to realize the reconfigurable light projecting apparatuses 1*a* and 1*b*. In addition, the second control unit 7 may control the timing at which the plurality of light projecting groups emit the optical signal. For example, in the case of FIG. 11, the light projecting units 2 belonging to the first to third light projecting groups 2-1 to 2-3 may emit optical signals at substantially the same timing, or may emit optical signals at different timings.

As described above, in the third embodiment, since the plurality of light projecting units 2 are classified into the plurality of light projecting groups and the light emission direction is controlled for each light projecting group, the light emission range can be expanded as compared with the case where the light emission ranges of the plurality of light projecting units 2 are aligned. Therefore, in a case where the light projecting apparatuses 1*a* and 1*b* according to the present embodiment are applied to the distance measuring apparatus, it is possible to measure a distance to an object present in a wider range, and practicality is enhanced. In addition, by changing which light projecting unit 2 is classified into which light projecting group as necessary, it is possible to realize the reconfigurable light projecting apparatuses 1*a* and 1*b*.

Fourth Embodiment

As described above, the light projecting apparatuses 1, 1*a*, and 1*b* according to the first to third embodiments can be applied to the distance measuring apparatus.

Figure 12:
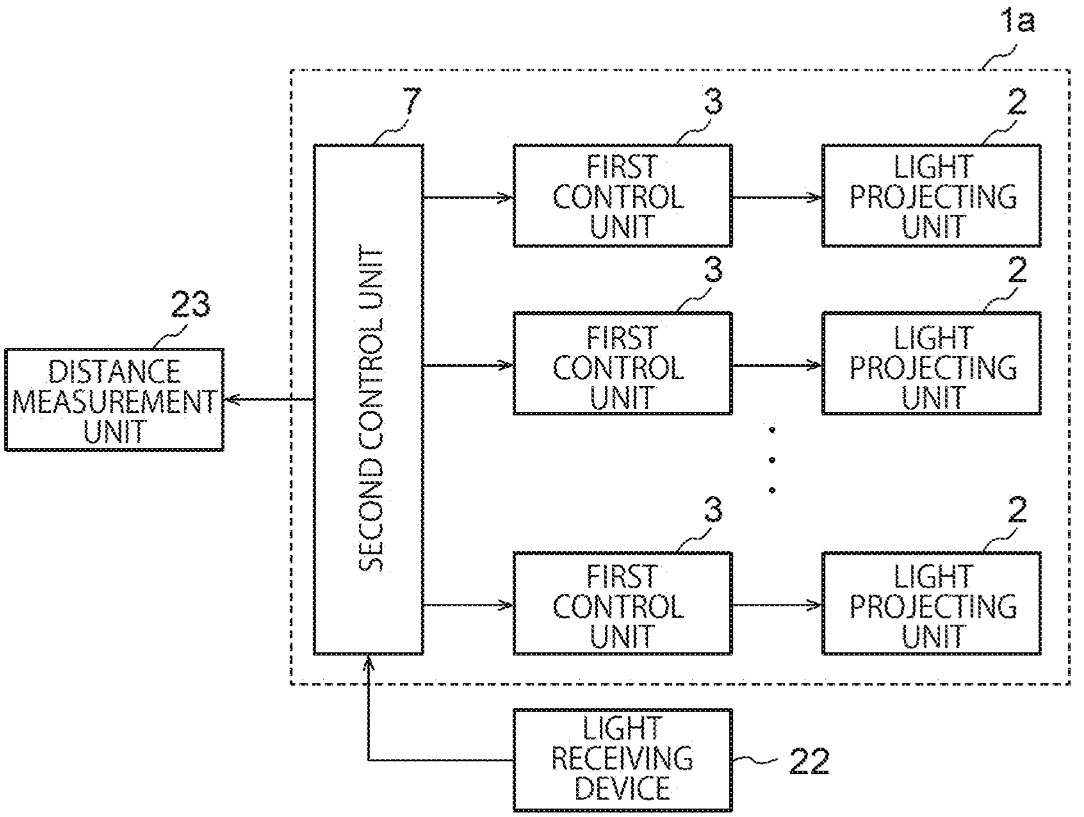
FIG. 12 is a block diagram illustrating a schematic configuration of a distance measuring apparatus incorporating the light projecting apparatus.

FIG. 12 is a block diagram illustrating a schematic configuration of a distance measuring apparatus 21 incorporating the light projecting apparatuses 1, 1*a*, and 1*b* according to any one of the first to third embodiments. The distance measuring apparatus 21 of FIG. 12 includes the light projecting apparatuses 1, 1*a*, and 1*b* according to any one of the first to third embodiments, a light receiving device 22, and a distance measurement unit 23.

The light receiving device 22 receives a reflected optical signal obtained by reflecting a plurality of optical signals emitted from the light projecting apparatuses 1, 1*a*, and 1*b* by an object. The light receiving device 22 may include a light receiving module in which a plurality of light receiving elements are two-dimensionally arranged. The light receiving element may be a single photo avalanche diode (SPAD). Since the SPAD can detect one photon, it is possible to detect a weak reflected optical signal from a distant object.

The distance measuring apparatus 21 measures the distance by, for example, a direct time of flight (dToF) method. In the dToF method, the distance to the object is measured based on the time difference between the timing at which the light projecting apparatuses 1, 1*a*, and 1*b* emit the optical signal and the timing at which the light receiving device 22 receives the reflected optical signal.

The second control unit 7 in the distance measuring apparatus 21 of FIG. 12 may supply the angle command signals to the plurality of first control units 3 so that the plurality of light projecting units 2 emit the optical signal in substantially the same emission direction, or may supply the angle command signal to the corresponding first control unit 3 for each light projecting group obtained by classifying the plurality of light projecting units 2 into a plurality of light projecting groups.

As described above, each light projecting unit 2 in the distance measuring apparatus 21 repeatedly emits the optical signal while scanning the optical signal in the two-dimensional direction within the predetermined light emission range, the light receiving device 22 continuously receives the reflected optical signal, and the distance measurement unit 23 measures the distance to the object based on the light reception result. The cycles in which the light projecting units 2 scan the optical signal within the light emission range are not necessarily the same.

Assuming that each light projecting unit 2 emits the optical signal at a predetermined time interval (for example, a time interval determined by the eye safe reference), as the time during which each light projecting unit 2 scans the optical signal in the light emission range is longer, the number of optical signals emitted from each light projecting unit 2 increases while the light emission range is scanned, and the presence or absence of an object in the light emission range and the shape of the object can be detected more accurately.

Figure 13:
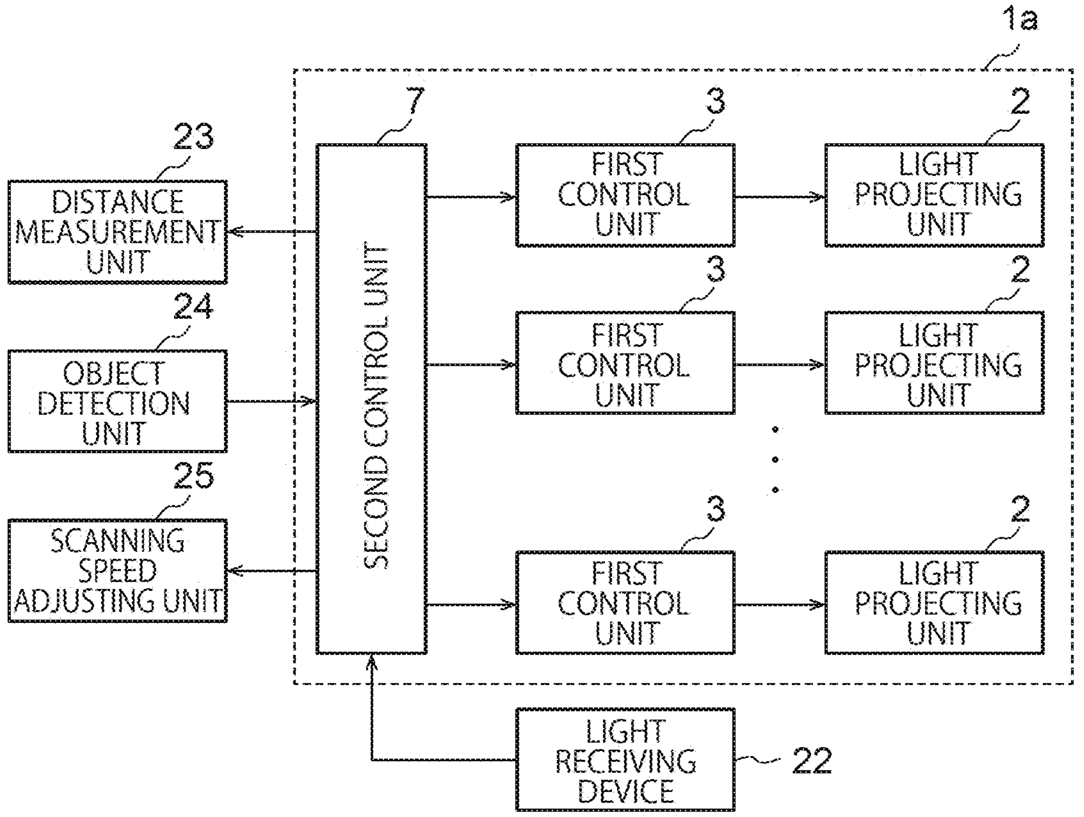
FIG. 13 is a block diagram of a distance measuring apparatus in which an object detecting unit and a scanning speed adjusting unit are added to the configuration of FIG. 11.

FIG. 13 is a block diagram of a distance measuring apparatus 21*a* in which an object detecting unit 24 and a scanning speed adjusting unit 25 are added to the configuration of FIG. 12.

The object detecting unit 24 detects an object present in the light emission range while the plurality of light projecting units 2 scan the optical signals in the light emission range. The scanning speed adjusting unit 25 adjusts the length of the cycle in which the optical signal scans the light emission range. More specifically, the scanning speed adjusting unit 25 makes the scanning speed when the optical signal is scanned within the range where the object detected by the object detecting unit is present slower than the scanning speed when the optical signal is scanned outside the range. It is assumed that each light projecting unit 2 emits an optical signal at a constant time interval.

In the distance measuring apparatus 21*a* of FIG. 13, the scanning speed adjusting unit 25 sets the length of the cycle in which the optical signal scans the light emission range to a first scanning cycle, and then starts a distance measuring operation. The object detecting unit 24 detects whether or not the light receiving device 22 has received the reflected optical signal from the object while the light projecting apparatuses 1, 1*a*, and 1*b* are scanning the light emission range with the first scanning cycle.

When the signal level of the light reception signal of the light receiving device 22 is equal to or higher than a predetermined threshold level, the object detecting unit 24 determines that the reflected optical signal has been received. The object detecting unit 24 detects all objects present in the entire light emission range.

For example, in a case where one object is detected in the light emission range, the scanning speed adjusting unit 25 decreases the scanning speed of the optical signal when scanning the vicinity of the detection position of the object in the light emission range. As a result, more optical signals can be emitted in the vicinity of the detection position of the object in the light emission range, and the depth shape of the object can be detected more accurately.

Figure 14:
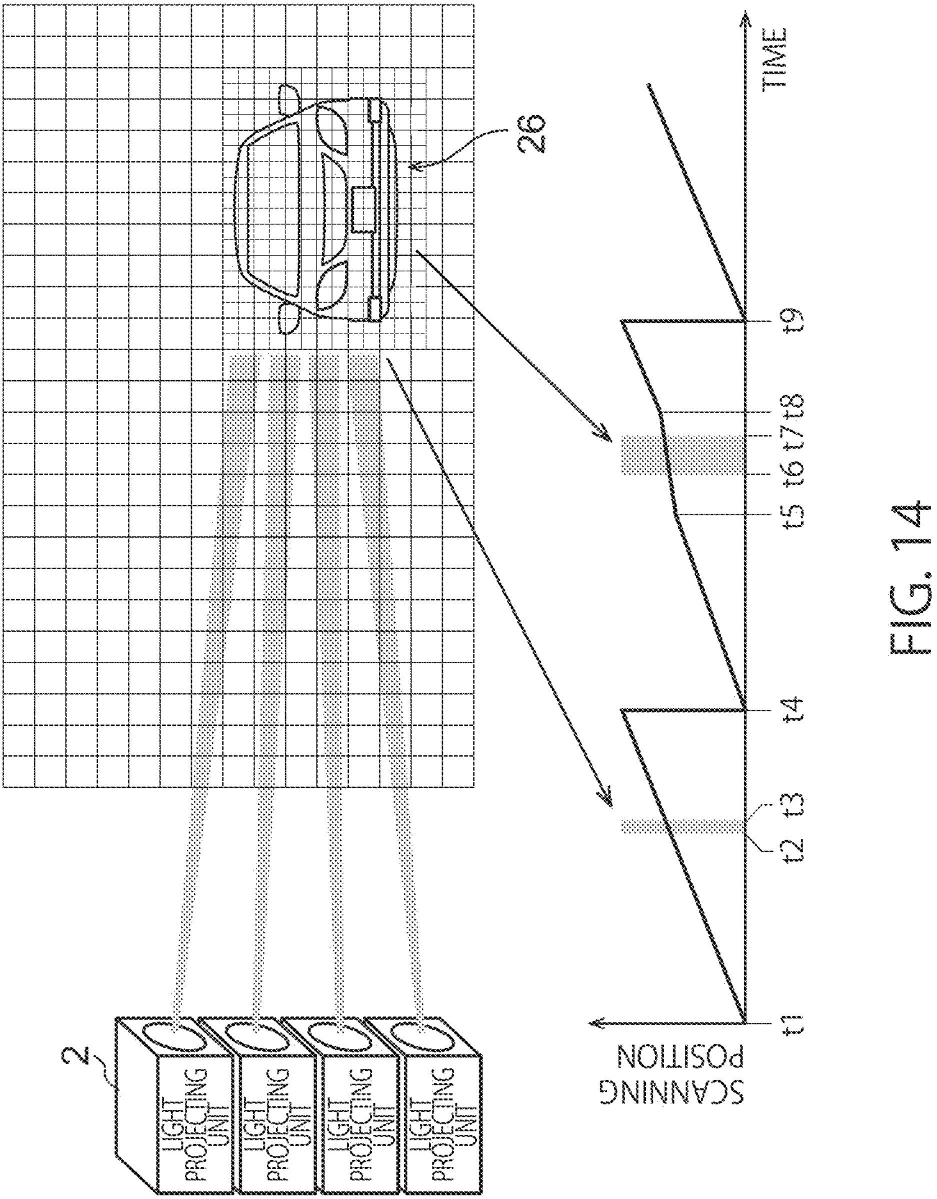
FIG. 14 is a diagram illustrating an example in which one object is present in a light emission range.

FIG. 14 illustrates an example in which one object (vehicle in the example of FIG. 14) 26 is present in the lower right region in the light emission range. Each square in the light emission range in FIG. 14 indicates the emission timing of the optical signal. In the vicinity of the detection position of the object 26, the size of the square is small, indicating that more optical signals are radiated to the vicinity of the detection position of the object 26 to more finely detect the depth shape of the object 26.

On the lower side of FIG. 14, a timing chart in a case where the light emission range is scanned twice is shown. Hereinafter, a scanning cycle at a first time is referred to as a first scanning cycle, and a scanning cycle at a second time is referred to as a second scanning cycle.

In the lower right timing diagram of FIG. 14, the horizontal axis represents time, and the vertical axis represents a scanning position within the light emission range. The vertical axis may be a scanning angle. In FIG. 14, time t1 to time t4 are the first scanning cycle, and time t4 to time t9 are the second scanning cycle. In the first scanning cycle, since each light projecting unit 2 scans the optical signal at a constant scanning speed, the scanning position changes linearly with time. A period from time t2 to time t3 in the first scanning cycle is a period for scanning a region where the vehicle is present in the light emission range. Since the signal level of the light reception signal received by the light receiving device 22 increases in this period, the object detecting unit 24 detects the object 26.

In the second scanning cycle, the optical signal is initially scanned at the same scanning speed as in the first scanning cycle. When the scanning position of the optical signal is near the position of the object 26, the scanning speed adjusting unit 25 decreases the scanning speed of the optical signal. As described above, since each light projecting unit 2 emits the optical signal at regular time intervals, when the scanning speed of the optical signal decreases, it is possible to emit more optical signals while scanning the vicinity of the position of the object 26. Therefore, the depth shape of the object 26 can be detected more accurately.

In FIG. 14, at time t4 to time t5, the scanning position changes at the same inclination as that at time t1 to time t4 near the position of the object 26, whereas, at time t5 to time t8, the change in the scanning position per unit time becomes smaller. The object 26 is detected in a period from time t6 to time t7. A period t6 to t7 during which the object 26 is detected in the second scanning cycle is longer than a period t2 to t3 during which the object 26 is detected in the first scanning cycle. Therefore, in the period from time t6 to time t7, the object 26 can be irradiated with more optical signals than during the period from time t2 to time t3.

Figure 15:
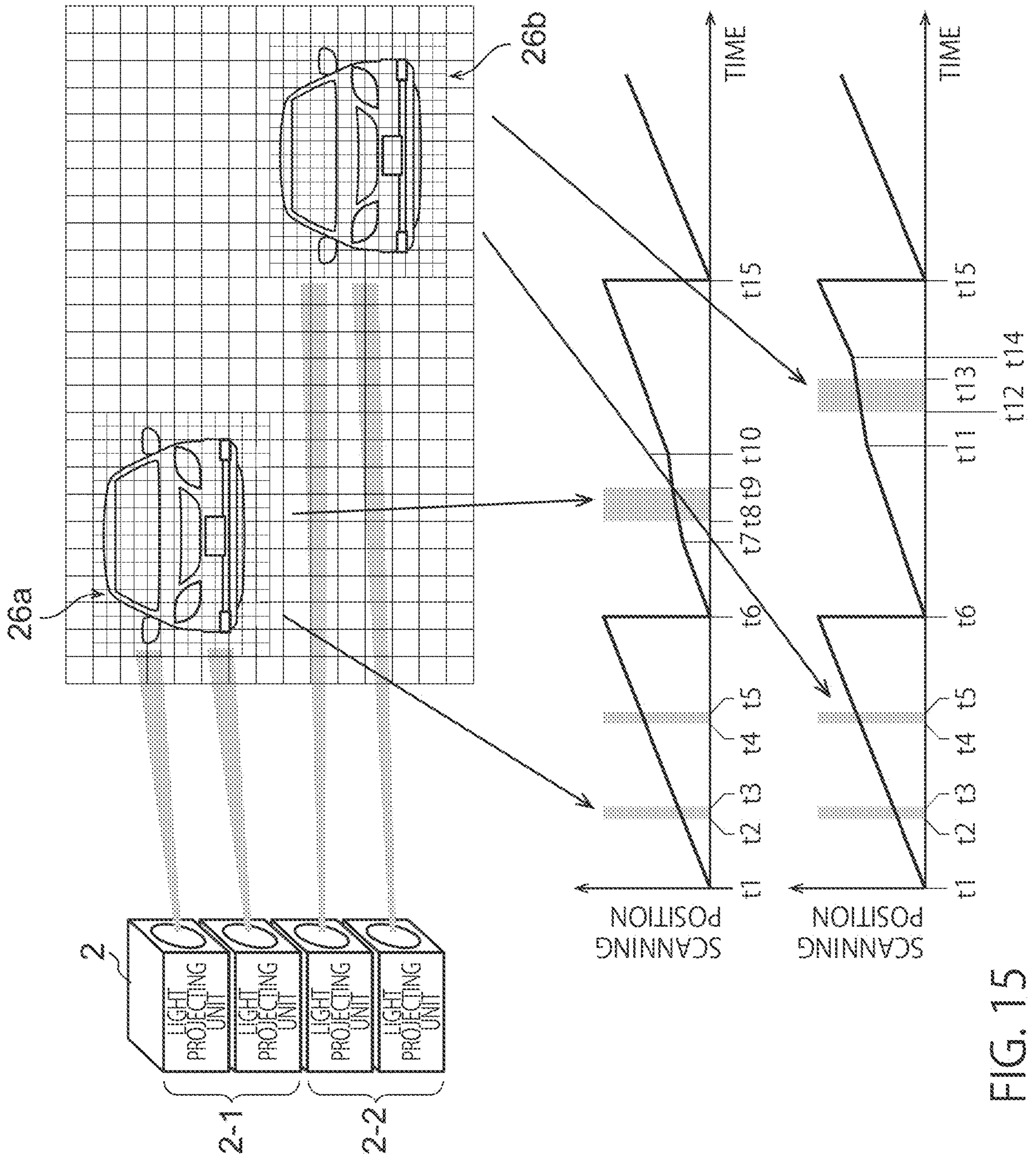
FIG. 15 is a diagram illustrating an example in which a plurality of objects are present within a light emission range.

FIG. 15 is a diagram illustrating an example in which a plurality of (two in the example of FIG. 15) objects 26 are detected in the light emission range. In this case, the plurality of light projecting units 2 are classified into a plurality of light projecting groups according to the number of detected objects 26. In the case of FIG. 15, since two objects 26 are detected in the light emission range, the plurality of light projecting units 2 are classified into two light projecting groups. The number of the light projecting units 2 belonging to each light projecting group is freely selectable.

In FIG. 15, time t1 to time t6 are the first scanning cycle, and time t6 to time t15 are the second scanning cycle. In the first scanning cycle, the entire region in the light emission range is scanned at a constant scanning speed. While the inside of the light emission range is scanned in the first scanning cycle, the object detecting unit 24 detects two objects 26 in the light emission range. As described above, the object detecting unit 24 detects the object 26 when the signal level of the light reception signal of the light receiving device 22 exceeds the predetermined threshold.

The object detecting unit 24 detects two objects 26 at time t2 to time t3 and time t4 to time t5 in the first scanning cycle.

The first control unit 3 classifies the plurality of light projecting units 2 into, for example, two light projecting groups (the first light projecting group 2-1 and the second light projecting group 2-2) since two objects (a first object and a second object) 26*a* and 26*b* are detected by the object detecting unit 24, and decreases the scanning speed when the two light projecting units 2 belonging to the first light projecting group 2-1 scan the vicinity of the position of the first object 26*a* to more accurately detect the depth shape of the first object 26*a*. In addition, the scanning speed is decreased when the two light projecting units 2 belonging to the second light projecting group 2-2 scan the vicinity of the position of the second object 26*b* to more accurately detect the depth shape of the second object 26*b*. In the example of FIG. 15, the first light projecting group 2-1 scans the optical signal in the periods from time t6 to time t7 and from time t10 to time t15 in the second scanning cycle in the same cycle as the first scanning cycle. In the period from time t7 to time t10, the scanning speed of the optical signal is reduced because the position is near the position of the object 26. The object 26 is detected in a period from time t8 to time t9. On the other hand, the second light projecting group 2-2 scans the optical signal in the periods from time t6 to time t11 and from time t14 to time t15 in the second scanning cycle in the same cycle as the first scanning cycle. In the period from time t11 to time t14, the scanning speed of the optical signal is reduced because the position is near the position of the object 26. The object 26 is detected in a period from time t12 to time t13.

As illustrated in FIG. 15, if the depth shape of the object 26 is detected by slowing the scanning speed by a separate light projecting group for each object 26 detected in the light emission range, the depth shape of each object 26 can be accurately detected without making the second scanning cycle longer than the first scanning cycle.

As described above, in the fourth embodiment, since the light projecting apparatuses 1, 1*a*, and 1*b* according to the first to third embodiments are applied to the distance measuring apparatuses 21 and 21*a*, an object 26 in a wide range can be accurately detected.

Furthermore, in the distance measuring apparatus 21*a* of FIG. 13, when the object 26 is detected in the light emission range, the scanning speed is reduced when the vicinity of the position of the detected object 26 is scanned with an optical signal. As a result, the depth shape of the object 26 can be detected more accurately.

Furthermore, in a case where a plurality of objects 26 are detected in the light emission range, the plurality of light projecting units 2 are classified into a plurality of light projecting groups in accordance with the number of detected objects 26, and the corresponding objects 26 can be detected at a slow scanning speed in each light projecting group, so that the depth shapes of the plurality of objects 26 in the light emission range can be accurately detected.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A light projecting apparatus comprising:

a plurality of light projectors, each being capable of switching an emission direction and an emission timing of an optical signal;

a plurality of first controllers, each controlling an emission direction and an emission timing of an optical signal emitted from a corresponding light projector among the plurality of light projectors;

a second controller that supplies an angle command signal related to an emission direction of an optical signal to each of the plurality of first controllers; and a storage device that stores a correspondence relationship between a reference command signal commonly used by the plurality of light projectors and a plurality of the angle correction signals respectively corresponding to the plurality of light projectors, wherein the second controller generates the angle command signal by adding the reference command signal to the corresponding angle correction signal read out from the storage device corresponding to each of the plurality of light projectors.

2. The light projecting apparatus according to claim 1, wherein the storage device stores a plurality of sets of correspondence relationships between the reference command signal and the plurality of angle correction signals, and the plurality of angle correction signals are different for each set, and the second controller selects one set from the plurality of sets stored in the storage device, reads the corresponding angle correction signal from the storage device for each of the plurality of light projectors based on the correspondence relationship of the selected set, and adds the corresponding angle correction signal to the reference command signal, thereby generating the angle command signal.

3. The light projecting apparatus according to claim 1, further comprising a scanning controller that controls the plurality of light projectors to collectively scan a plurality of optical signals emitted from the plurality of light projectors in a one-dimensional direction or a two-dimensional direction.

4. The light projecting apparatus according to claim 1, wherein the second controller supplies each of the plurality of angle command signals to the corresponding light projector such that a plurality of optical signals emitted from the plurality of light projectors travel in parallel.

5. The light projecting apparatus according to claim 4, wherein the plurality of first controllers emit the optical signals at the same timing.

6. The light projecting apparatus according to claim 1, wherein the plurality of light projectors comprise a plurality of light projecting groups that emit optical signals in different emission directions, and the one or more light projectors belonging to each of the plurality of light projecting groups emit an optical signal in a corresponding emission direction.

7. The light projecting apparatus according to claim 6, wherein the second controller classifies each of the plurality of light projectors into any one of the plurality of light projecting groups, and controls an emission direction for each of the plurality of light projecting groups.

8. The light projecting apparatus according to claim 1, wherein each of the plurality of light projectors comprises:

a light source that emits an optical signal according to control of the first controller;

an optical system that shapes the optical signal emitted from the light source; and a scanner that switches an emission direction of the optical signal shaped by the optical system according to control of the first controller.

9. The light projecting apparatus according to claim 8, wherein the light source repeatedly emits an optical signal at a constant cycle, and the scanner is capable of changing a scanning speed of an optical signal within a partial region within a scanning range of the optical signal.

10. The light projecting apparatus according to claim 1, wherein the plurality of light projectors emit optical signals conforming to a laser safety standard, and sets optical intensity of the optical signals so that the optical signals at least partially overlap each other in a range separated from the plurality of light projectors by a predetermined distance or more and so as to conform to the laser safety standard in the overlapped state.

11. The light projecting apparatus according to claim 1, wherein, in the optical signals emitted from the plurality of light projectors, a change in a beam width with respect to an optical path length is larger in a second direction than in a first direction, and at least two or more light projectors among the plurality of light projectors are arranged at intervals in the second direction.

12. A distance measuring apparatus comprising:

a light projecting apparatus;

a light receiving device that receives a reflected optical signal obtained by reflecting an optical signal emitted from the light projecting apparatus by an object; and a distance measurer that measures a distance to the object based on the optical signal emitted from the light projecting apparatus and the reflected optical signal received by the light receiving device, wherein the light projecting apparatus comprises:

a plurality of light projectors, each being capable of individually controlling an emission direction and an emission timing of an optical signal;

a plurality of first controllers, each controlling an emission direction and an emission timing of an optical signal emitted from a corresponding light projector among the plurality of light projectors;

a second controller that supplies an angle command signal related to an emission direction of an optical signal to each of the plurality of first controllers; and a storage device that stores a correspondence relationship between a reference command signal commonly used by the plurality of light projectors and a plurality of the angle correction signals respectively corresponding to the plurality of light projectors, wherein the second controller generates the angle command signal by adding the reference command signal to the corresponding angle correction signal read out from the storage device corresponding to each of the plurality of light projectors.

13. The distance measuring apparatus according to claim 12, wherein each of the plurality of light projectors comprises:

a light source that emits an optical signal according to control of the first controller;

an optical system that shapes the optical signal emitted from the light source; and a scanner that scans the optical signal shaped by the optical system in a one-dimensional direction or a two-dimensional direction.

14. The distance measuring apparatus according to claim 13, further comprising:

an object detector that detects a position of the object based on the reflected optical signal received by the light receiving device; and a scanning speed adjuster that makes a scanning speed when an optical signal is scanned within a range where the object detected by the object detector is present slower than a scanning speed when an optical signal is scanned outside the range.

15. The distance measuring apparatus according to claim 14, wherein the light projecting apparatus comprises a second controller that supplies an angle command signal related to an emission direction of an optical signal to each of the plurality of first controllers, when the object detector detects positions of a plurality of the objects, the second controller divides the plurality of light projectors into a plurality of light projecting groups in accordance with the number of the detected objects and associates one of the objects with each of the light projecting groups, and the light projector belonging to each of the plurality of light projecting groups scans the optical signal at a scanning speed when an optical signal is scanned within a range where a corresponding object is present slower than a scanning speed when an optical signal is scanned outside the range based on control by the scanning speed adjuster.

16. A light projection control method of laser light comprising:

radiating, by a plurality of light projectors, laser light such that beams of the laser light at least partially overlap each other in a range separated from emission positions of the laser light by a predetermined distance or more;

setting light intensity of the laser light emitted by the plurality of light projectors and an interval between the plurality of light projectors such that light intensity of the laser light at the time of emission and light intensity of the overlapping laser light conform to a laser safety standard, controlling, by a plurality of first controllers, an emission direction and an emission timing of the laser light emitted from a corresponding light projector among the plurality of light projectors;

supplying an angle command signal related to an emission direction of the laser light to each of the plurality of first controllers; and storing, by a storage device, a correspondence relationship between a reference command signal commonly used by the plurality of light projectors and a plurality of the angle correction signals respectively corresponding to the plurality of light projectors, wherein the angle command signal is generated by adding the reference command signal to the corresponding angle correction signal read out from the storage device corresponding to each of the plurality of light projectors.

17. A distance measuring apparatus comprising:

a light projecting apparatus;

a light receiving device that receives a reflected optical signal obtained by reflecting an optical signal emitted from the light projecting apparatus by an object; and a distance measurer that measures a distance to the object based on the optical signal emitted from the light projecting apparatus and the reflected optical signal received by the light receiving device, an object detector that detects a position of the object based on the reflected optical signal received by the light receiving device; and a scanning speed adjuster that makes a scanning speed when an optical signal is scanned within a range where the object detected by the object detector is present slower than a scanning speed when an optical signal is scanned outside the range, wherein the light projecting apparatus comprises:

a plurality of light projectors, each being capable of individually controlling an emission direction and an emission timing of an optical signal; and a plurality of first controllers, each controlling an emission direction and an emission timing of an optical signal emitted from a corresponding light projector among the plurality of light projectors, wherein each of the plurality of light projectors comprises:

a light source that emits an optical signal according to control of the first controller;

an optical system that shapes the optical signal emitted from the light source; and a scanner that scans the optical signal shaped by the optical system in a one-dimensional direction or a two-dimensional direction, wherein the light projecting apparatus comprises a second controller that supplies an angle command signal related to an emission direction of an optical signal to each of the plurality of first controllers, when the object detector detects positions of a plurality of the objects, the second controller divides the plurality of light projectors into a plurality of light projecting groups in accordance with the number of the detected objects and associates one of the objects with each of the light projecting groups, and the light projector belonging to each of the plurality of light projecting groups scans the optical signal at a scanning speed when an optical signal is scanned within a range where a corresponding object is present slower than a scanning speed when an optical signal is scanned outside the range based on control by the scanning speed adjuster.

* * * * *